July 25, 1961
C. P. TYLER
2,993,846
METHOD FOR DISSOLVED OXYGEN DETERMINATION
Filed April 1, 1959
3 Sheets-Sheet 1
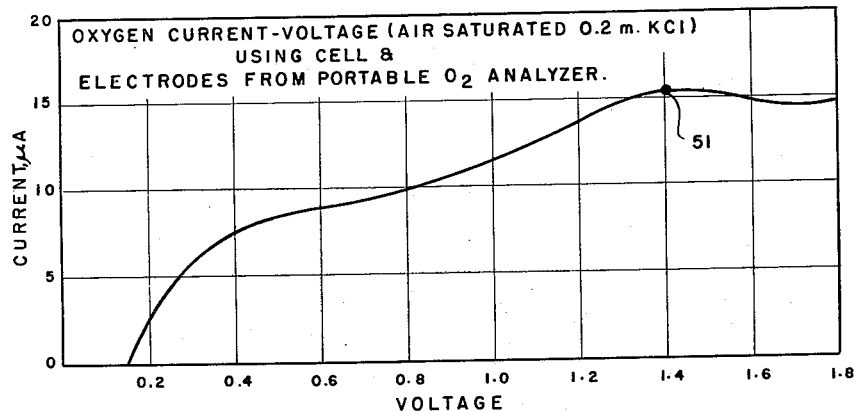
FIG. 2.
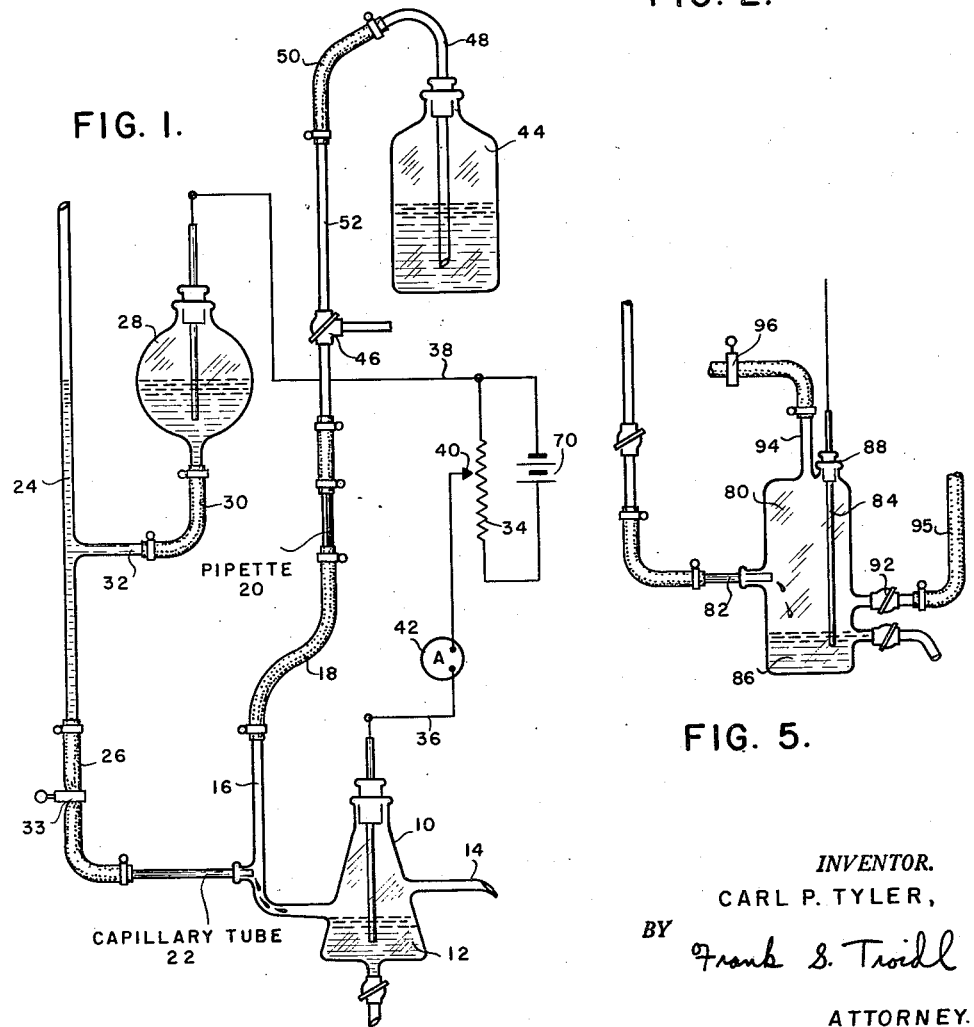
FIG. 1.
FIG. 5.
INVENTOR.
CARL P. TYLER,
BY Frank S. Troidl
ATTORNEY.

FIG. 6.
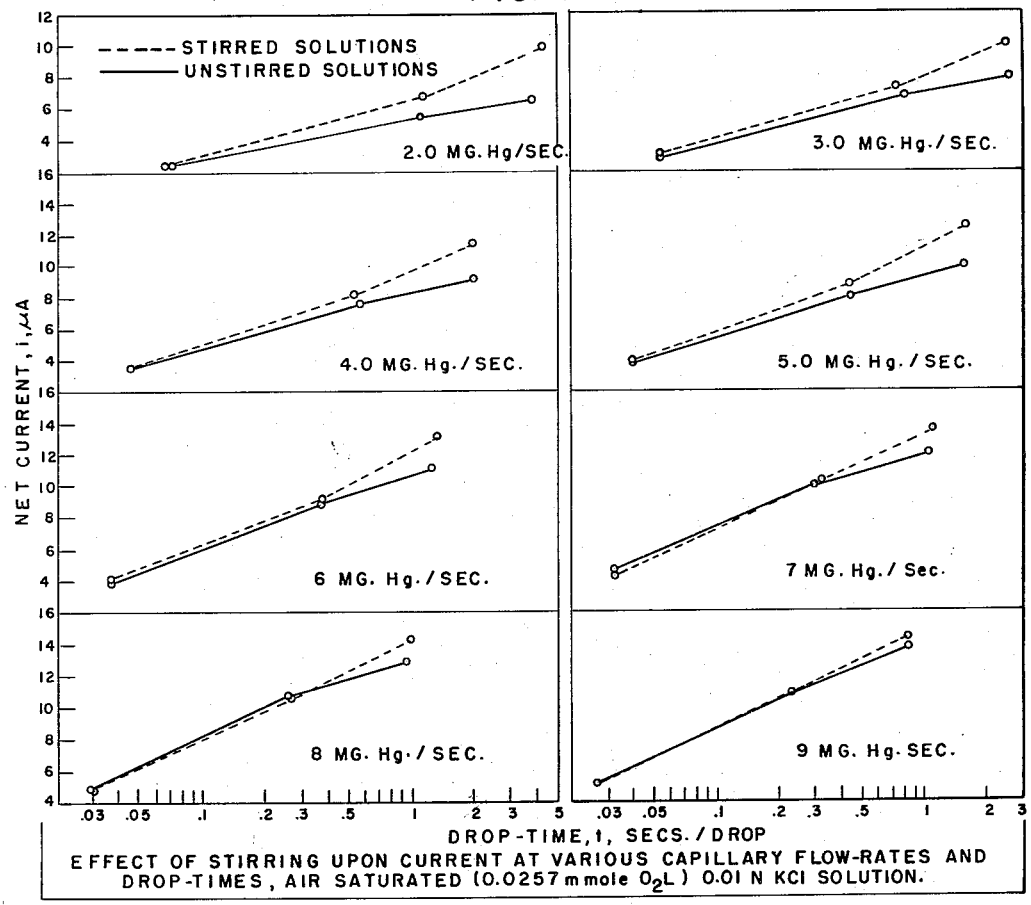
EFFECT OF STIRRING UPON CURRENT AT VARIOUS CAPILLARY FLOW-RATES AND DROP-TIMES, AIR SATURATED (0.0257 mmole $O_2$L) 0.01 N KCl SOLUTION.
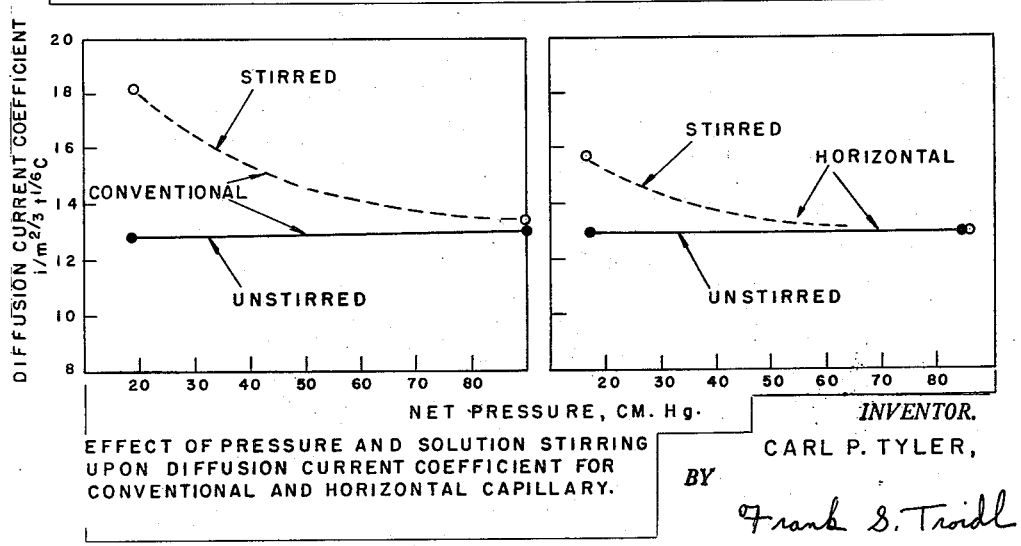
EFFECT OF PRESSURE AND SOLUTION STIRRING UPON DIFFUSION CURRENT COEFFICIENT FOR CONVENTIONAL AND HORIZONTAL CAPILLARY.
FIG. 7.
INVENTOR.
CARL P. TYLER,
BY Frank S. Troidl
ATTORNEY.

2,993,846
METHOD FOR DISSOLVED OXYGEN DETERMINATION
Carl P. Tyler, Baytown, Tex., assignor, by mesne assignments, to Esso Research and Engineering Company, Elizabeth, N.J., a corporation of Delaware
Filed Apr. 1, 1959, Ser. No. 803,389
3 Claims. (Cl. 204—1)

This invention relates to processes and apparatus for carrying out dissolved oxygen determinations. More particularly, this invention relates to a process for the determination of dissolved oxygen in an electrolytic liquid using an instrument including a dropping mercury electrode and a mercury pool anode. The process can be performed with the apparatus of this invention, which apparatus is portable and particularly adapted for measuring the amount of dissolved oxygen in industrial and natural waters.

This application is a continuation-in-part of my application, Serial No. 665,851, filed June 14, 1957, entitled "Polarographic Apparatus," now Patent No. 2,962,432, issued November 29, 1960.

The determination of the oxygen content of certain liquids is very important. For example, the oxygen content of industrial and natural waters may be an indication of the pollution of the waters. A small amount of dissolved oxygen in the waters indicates the water may be highly polluted, the small amount of dissolved oxygen being caused by the using up of oxygen by the polluting materials.

Current dissolved oxygen determining methods and devices do not give an accurate indication of the amount of dissolved oxygen in a liquid, except under ideal conditions in the laboratory. When carrying out conventional methods with conventional devices, the slightest vibration or jarring of the device causes inaccurate and spurious signals to be recorded.

Often, in order to obtain an accurate indication of the amount of dissolved oxygen in water, the apparatus should be used in the field. If a sample obtained from the field is brought back to the laboratory where the oxygen content is determined, the indicated oxygen content may not be the actual oxygen content of the water at the time the sample was taken in the field. A method and apparatus which can be used directly in the field for determining the oxygen content of a liquid is obviously highly desirable.

Another disadvantage of current methods and devices is that it is impossible to obtain an indication of the amount of dissolved oxygen in a continuously flowing sample. The current devices require that a stationary sample be used. This is so because in currently utilized devices, the vibrations or movements cause mercury drop oscillations and hence, result in spurious readings.

A method and device which can be used both in the laboratory and in the field, is not subject to false readings due to mercury drop oscillations, and can be used for obtaining an accurate reading on a flowing sample as well as a stationary sample, are highly desirable. My new method and apparatus fulfill all of these requirements.

Another advantage of my new method and device is that it can be used even when the solution being tested is stirred or agitated. This is an extremely valuable attribute as it makes possible the use of my new method and apparatus for amperometric titrations where the solution can be continually purged with nitrogen and agitated.

My new process for the determination of dissolved oxygen in an electrolytic liquid is performed with an instrument including a dropping mercury electrode as the cathode and a mercury pool anode. The space between the dropping mercury electrode and the mercury pool is filled with the liquid, if a stationary sample is to be tested. An electrical circuit is used to impress a voltage across the electrodes. The liquid thus forms a part of the electrical circuit. If a flowing sample is being tested, the sample liquid is flowed past both of the electrodes and again forms a part of the electrical circuit. Discrete droplets of mercury are caused to flow from the dropping mercury electrode to the mercury pool. The drop-time is controlled within a very close limit. In carrying out my new method, the drop-time is very important. This drop-time preferably ranges from 0.20 to 0.33 second to obtain the desired portability characteristic. As the drop-time is varied outside of the range of 0.20 to 0.33 second, the performance of the apparatus gradually deteriorates. The voltage applied is of such a magnitude that the current through the electrical circuit, corrected for temperature variation and for residual current, is proportional to the dissolved oxygen in the liquid.

The discrete droplets from the dropping mercury electrode should preferably be at a flow rate of at least 7 milligrams per second. At lower flow rates, vibration and stirring of the liquid tend to cause inaccurate current indications, even within the preferred drop-time range of 0.20 to 0.33 second.

The new apparatus is an instrument for the determination of dissolved oxygen in aqueous solutions. It comprises an electrolysis cell suitable for containing a stationary or flowing sample in contact with two electrodes, one of which may be a mercury pool and the other a dropping mercury electrode system constructed to drop at a rate of approximately 0.20 to 0.33 second when an impressed voltage of approximately 1.2 to 1.8 volts is applied through the electrodes across the cell, and a meter for measuring the current flowing from the reduction of dissolved oxygen in the sample.

The new apparatus is particularly adapted for use with a continuously flowing sample. To this end, a sample fluid inlet and a sample fluid outlet are provided in the vessel such that the fluid sample can be made to flow past the dropping mercury electrode and the mercury pool.

Referring to the drawings in which:

FIG. 1 is a schematic diagram showing one preferred embodiment of the apparatus;

FIG. 2 is a graph showing the voltage-current relationship of readings taken on an air-saturated 0.2 molar KCl solution;

FIG. 5 is a schematic view showing a second embodiment of a cell which can be used to carry out my new method;

Figure 4:
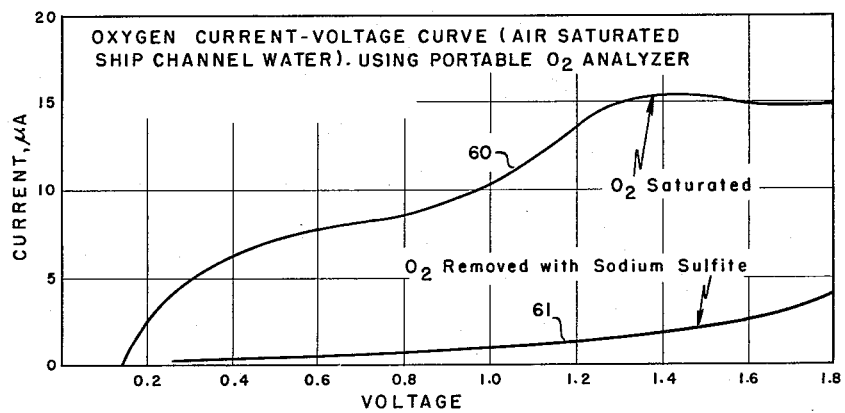
FIG. 4 is a current-voltage graph of readings taken with oxygen-saturated ship channel water, and readings taken with the oxygen removed from the ship channel water.

FIG. 6 includes a plurality of graphs showing the effect of stirring on the indicated current at various capillary flow-rates and drop-times using an air-saturated 0.01 N KCl solution; and FIG. 7 shows graphical representations of the effect of pressure and solution stirring upon the diffusion current coefficient for a conventional vertical capillary as compared to my new apparatus and method.

FIG. 1 shows schematically an arrangement adapted for use for measuring a flowing sample. A vessel 10 is shown which is partially filled with mercury 12. Vessel 10 may be provided with a side arm 14 providing a fluid flow outlet. A second side arm 16 is provided and is integrally connected to the vessel 10. This side arm 16 is hollow and preferably L-shaped.

The horizontal portion of side arm 16 terminates at a point on vessel 10 above the level of the mercury 12 to permit sample flow into vessel 10, over mercury 12, and out fluid flow outlet 14.

Flexible tubing 18 is attached to the vertical portion of L-shaped side arm 16. The flexible tubing 18, L-shaped member 16, vessel 10, and fluid outlet 14 provide a continuous path for the flow of the sample to be tested. The rate of flow of the sample is controlled by means of a pipette 20 inserted in the upper end of tubing 18.

A capillary tube 22 is connected to the side arm member 16. Capillary tube 22 is horizontally mounted so that the drops of mercury through the capillary tube 22 will flow down the side arm 16 and into the mercury pool 12.

A vertically-extending tube 24 is connected to capillary tube 22 through a flexible rubber or plastic tube 26. To provide a mercury head to capillary tube 22, a mercury reservoir 28 is disposed at a predetermined level above the capillary tube 22. The reservoir 28 is connected to the capillary tube by means of a flexible tube 30, side arm 32, tube 24, and flexible tube 26. A screw clamp 33 for stopping mercury flow is mounted about flexible tube 26.

This arrangement provides for the rapid dropping of the mercury from the mercury electrode 22 which is controlled within the drop-time range of 0.20 to 0.33 second by (1) the height of the mercury reservoir 28 above the tube 22, (2) the size of the capillary opening in the tube 22, and (3) the horizontal position of the tube in the apparatus.

The horizontal positioning of the tube is used because the proper drop-rate is easier to obtain and maintain than in other positions of the tube. However, it is possible to alter the electrode geometry and get the desired flow-rate without requiring a horizontal position.

Another means for obtaining the desired drop-rate is to scratch or abrade the capillary orifice. A properly made scratched or abraded orifice may produce mercury drops in the desired rate range even if mounted vertically.

The height of the mercury head in tube 24 is maintained at a level so that for a capillary tube having a particular hole diameter, the drop-time of the mercury drops will range from 0.20 to 0.33 second with a mercury flow from the dropping mercury electrode of at least 7 milligrams per second.

A battery 70 has its positive terminal connected by means of a potentiometer 34 to conductive lead 36 which extends into the mercury 12 in the vessel 10. The negative terminal of battery 70 is connected to a lead 38 which extends into the mercury in the reservoir 28. Hence, an electrical voltage is established across the mercury drops between tube 22 and the mercury 12.

The moveable arm 40 of the potentiometer is used to control the voltage across the cell formed by tube 22, the mercury drops, and the mercury 12. The current flow through the fluid sample under test is indicated by means such as in ammeter 42 in series with the leads 38 and 36. If no electrolyte occurs naturally in the fluid tested, an electrolyte such as KCl should be added to the sample.

When used with a stationary sample or a sample being stirred or agitated, the sample is contained within the vessel 10 and side arm 16. When used in the field, the liquid to be tested may be siphoned directly through tubing 18, side arm 16, vessel 10, and fluid outlet 14 to provide a continuous flow of fluid and continuous measurements of dissolved oxygen within the fluid. In the alternative, the fluid to be tested can be placed in a flask 44 and siphoned by means of a three-way stopcock 46 for siphoning the sample through siphoning tube 48, rubber or plastic tube 50, and tube 52 into the tube 18.

FIG. 5 is a schematic representation of a second embodiment of a cell structure which can be used to practice my new method of determining the oxygen content in a liquid sample. In FIG. 5, the capillary tube 82 is mounted directly to the side of the vessel 80. Capillary tube 82 is mounted in a substantially horizontal position, the same manner as capillary tube 22 of FIG. 1. The conductive electrode 84, which leads into the mercury pool 86, contained in the vessel 80, is mounted through a port 88 formed near the upper part of the vessel 80. The sample fluid to be tested can be siphoned into the vessel 80 through fluid inlet 95, controlled by valve 92, over the mercury pool 86, past the capillary tube 82, and out of the fluid outlet 94 at the top of the vessel 80. Fluid outlet 94 is controlled by valve 96.

The electrical circuit, mercury head, and mercury reservoir, etc. may be the same as the electrical circuit, mercury head, mercury reservoir, etc. of FIG. 1.

The method is based upon the reduction of dissolved oxygen at the dropping mercury electrode using a mercury pool as an anode. Oxygen is reduced at the dropping mercury electrode producing two reduction waves. The early wave is said to be due to the reduction of oxygen to hydrogen peroxide:

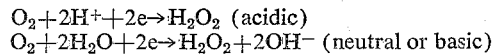

This wave reduces at a relatively low voltage, say 0.2 volts. However, it possesses a very short and shifting plateau.

The second wave results from the reduction of hydrogen peroxide to water or the hydroxyl ion:

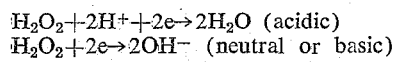

This wave is long and drawn out, but is well formed, has no maximum, and has a broad, flat plateau. In the use of a cell, the typical current-voltage curve at which the applied E.M.F. is plotting as the abscissa and the corresponding current as the ordinate, shows that the current increases as the voltage across the cell is increased. The current, however, does not increase indefinitely with increasing applied E.M.F., but approaches a limiting value. Other factors being constant, the limiting current is directly proportional to the amount of dissolved oxygen in the sample under test, thereby affording a quantitative analysis of the sample.

FIG. 2 shows a current-voltage curve obtained using my new apparatus on an air-saturated 0.2 molar KCl solution. An inspection of the curve shows that as the voltage across the cell is increased, the current increases, reaching a limiting value at point 51, which occurs at a voltage of approximately 1.4. Notice that the plateau, after the limiting value at point 51 is reached, remains substantially constant as the voltage is increased. The plateau results from the reduction of hydrogen peroxide to the water or the hydroxyl ion as described above. Therefore, if a voltage of at least 1.4 is applied across the cell by adjustment of the tap 40 along resistance 34 (see FIG. 1), the current flow through the cell will be proportional to the amount of dissolved oxygen in the sample. With more dissolved oxygen in the sample than shown in FIG. 2, the plateau will occur at a higher value of current. With less dissolved oxygen in the sample than that shown in FIG. 2, the limiting current or plateau will occur at a lower value. Hence, in applying my new method, a voltage is applied across the cell of such magnitude that the current is proportional to the dissolved oxygen in the liquid.

The current produced by the reduction of oxygen at the mercury electrode when the voltage is about 1.4 volts, or greater, must be corrected for variations in temperature and also corrected for residual current, i.e., the current through the sample with no oxygen therein.

Figure 3:
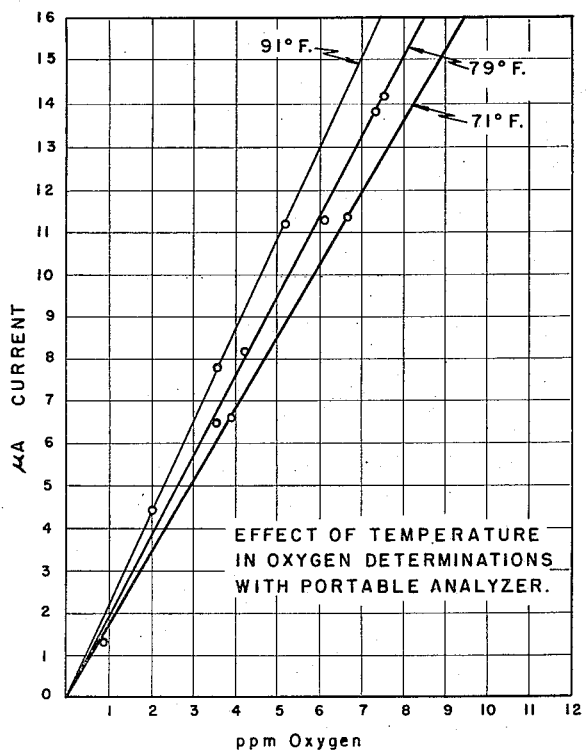
FIG. 3 is a graph taken with a voltage across the electrodes of 1.4 volts and showing the effect of temperature upon the readings.

FIG. 3 shows in graphical form a current-p.p.m. oxygen graph taken at temperatures of 71° F., 79° F., and 91° F., with an E.M.F. of 1.4 volts and corrected for residual current. It is seen from an examination of FIG. 3 that at higher temperatures the current reading increases for the same amount of dissolved oxygen in the sample. It can also be seen from FIG. 3 that the current is a linear function of the dissolved oxygen.

Using the room temperature, 79° F., as a standard temperature, a temperature correction factor can be obtained from FIG. 3 by use of the formula:

$$(1) \qquad \frac{i_{obs.}}{a(T_{obs.} - T_{std.}) + l} = i_{std.}$$

where $i_{obs}$ = the observed current
$T_{obs}$ = the observed temperature
$T_{std}$ = the standard temperature
$i_{std}$ = the current at standard temperature By solving for "a," a value of 0.012 is obtained, which, when substituted into the above formula, serves as a factor for correcting the current of an unknown sample to the standard temperature.

The correction for residual current may be obtained by use of the current-voltage graphs shown in FIG. 4. These graphs were obtained by my new apparatus on a sample of air-saturated ship channel water. Curve 60 is the current-voltage curve for the air-saturated water and curve 61 is the current-voltage relationship with the oxygen removed from the water with sodium sulfite. Curve 61 represents the residual current. The amount of dissolved oxygen and samples of water thereafter obtained from the ship channel can be calculated by means of the formula:

$$(2) \qquad \left[\left(\frac{i_{obs}}{.012(T_{obs} - T_{std}) + l}\right) - i_{res}\right] \times F$$

$\times F$ = p.p.m. dissolved oxygen where $i_{res}$ = the residual current
$F$ = the calibration factor For best results the calibration should be made under conditions approximately those under which the samples are to be run. The net current is obtained by subtracting the residual current from the observed current through a solution of known oxygen content with corrections made for temperature. The p.p.m. dissolved oxygen divided by the net current gives the calibration factor "F."

A unique feature of my new method is the use of the rapid drop-rate. One way this rapid drop-rate can be efficiently and effectively obtained is by the use of the horizontally mounted capillary. This capillary has a fairly large diameter which issues relatively large quantities of mercury per second and produces a high current. The horizontal mounting of the capillary causes the drop to fall into the solution at right angles to the capillary orific. Since measurements are made on a simple and inexpensive microammeter at a fixed potential of sufficient magnitude to be along the plateaus described above in respect to FIG. 2, say from 1.2 volts to 1.8 volts.

The horizontal mounting of the capillary promotes a short drop-time, and the drop-time makes the current less sensitive to external vibration. The life of each drop is so short that even the relatively fast microammeter does not follow the drop oscillations, and hence very steady currents can be obtained. A rapid flow of mercury is desirable because this factor contributes to a high current which makes it possible to use an inexpensive and rugged microammeter for field use.

It is important to have the right drop-time with a given rate of mercury flow. Short drop-times produces systems that are insensitive to motion provided the mercury flow is sufficiently great. The drop-time should be in the range of 0.20 to 0.33 second per drop with a minimum flow of about 7 milligrams of mercury per second.

The reproducibility of this method is illustrated in Table I, which shows values obtained on consecutive samples withdrawn from the same source.

Table I

| Sample No. | Dissolved Oxygen, p.p.m. |
|---|---|
| 1 | 7.58 |
| 2 | 7.56 |
| 3 | 7.56 |
| 4 | 7.53 |
| 5 | 7.56 |
| 6 | 7.56 |
| 7 | 7.53 |
| 8 | 7.53 |
| 9 | 7.53 |
| 10 | 7.53 |
| 11 | 7.53 |
| 12 | 7.40 |

The required drop-times of 0.20 to 0.33 seconds in order to efficiently carry out my new method cannot be obtained effectively using the ordinary conventional apparatus. The factors affecting the drop-time of a conventional dropping mercury electrode, is given by the following equation:

$$(3) \qquad t = \frac{1.393 \times 10^{-9} \sigma l}{r_c^3 p}$$

where $t$ = drop-time, seconds
$\sigma$ = interfacial tension between mercury and aqueous solution, dynes per centimer
$l$ = length of capillary, centimeters
$r_c$ = radius of capillary, centimeters,
$p$ = net pressure, in centimeters of Hg.

From this equation, it may be seen that the drop-time can be decreased by a decrease in interfacial tension, a decrease in length of capillary, an increase in radius of capillary, or an increase in net pressure.

It should be pointed out that changing any of the last three factors will also change the flow-rate. For example, an increase in the capillary bore will increase the flow of mercury per second by a power of four. A decrease in length of capillary will also increase the flow of mercury. Likewise, an increase in pressure will also produce a greater mercury flow. Although an increase in mercury flow is not altogether objectionable since it does produce a larger current, there is a limit to the magnitude of the current that is desirable.

Using the conventional capillary, the shortest drop-time which can be obtained is in the range of 0.8 to 4.0 seconds/drop. Attempts to get a shorter drop-time result in the formation of a continuous streaming of mercury which is undesirable. Indiscriminate shortening of the capillary, increasing of bore or pressure can result in the obtainment of the undesired continuous streaming of mercury.

The new apparatus illustrated in FIGS. 1 and 5 utilizing the substantially horizontally mounted dropping mercury electrode produce the desired 0.20 to 0.33 second short drop-times without increasing mercury flow. The drop-time of this capillary is 0.285 time as great, and since the interfacial tension between mercury and water is about 375 dynes per centimeter, Equation 3 for a conventional apparatus becomes for my new apparatus:

$$(4) \qquad t = \frac{1.488 \times 10^{-7} l}{r_c^3 p}$$

Hence with all the other factor being the same as with a conventional apparatus, the drop-times from my new device is 0.285 time as great as the drop-times with the conventional polarograph.

Satisfactory ranges of $p$, $r_c$, and $l$ for carrying out the new process are the following:

$p=$ from 15 to 75 centimeters Hg.
$r_c=.004$ centimeter to .02 centimeter
$l=$ from 2 to 20 centimeters FIG. 6 shows in graphical form the effect of stirring upon the current at various capillary flow-rates and drop-times with an air-saturated 0.01 N KCl solution. Notice that with a mercury flow-rate of less than about 7 milligrams, the current with a stirred solution varies somewhat from the current using an unstirred solution. Hence, such a flow-rate range would be undesirable when using the method and apparatus for stirred solutions. Notice, however, that with a flow-rate of from 7 milligrams of mercury per second to 9 milligrams of mercury per second, the current with a stirred solution and an unstirred solution are the same or substantially the same in the drop-time range of from 0.20 to about 0.33 second. Hence, the graphs of FIG. 6 illustrate the better results obtained with a drop-time range of between 0.20 and 0.33 second and the desirability of a flow-rate of mercury of at least 7 milligrams per second.

FIG. 7 compares the diffusion current coefficient of stirred and unstirred solutions using conventional and horizontal capillaries. Notice that at no point on the graph is the diffusion current coefficient of the stirred solution the same as the diffusion current coefficient of the unstirred solution using a conventional capillary tube. However, notice that at the high end of the net pressure, which corresponds to a low drop-time, the diffusion current coefficient using the horizontal type capillary tube is the same whether the solution is stirred or unstirred.

I claim:

1. A process for the determination of dissolved oxygen in an electrolytic liquid using an instrument including a dropping mercury electrode and a mercury pool anode comprising the steps of: filling the space between the dropping mercury electrode and the mercury pool with the liquid so that the liquid forms part of an electrical circuit; causing discrete droplets of mercury to flow from the dropping mercury electrode with a drop-time ranging from 0.20 to 0.33 second; and applying a voltage to the electrical circuit of such magnitude that the current, corrected for temperature variation and for residual current, is proportional to the dissolved oxygen in the liquid.

2. A process for the determination of dissolved oxygen in an electrolytic liquid using an instrument including a substantially horizontally mounted dropping mercury electrode and a mercury pool anode comprising the steps of: filling the space between the dropping mercury electrode and the mercury pool with the liquid so that the liquid forms part of an electrical circuit; flowing mercury from the dropping mercury electrode at a rate of at least 7 milligrams per second and in discrete droplets with a drop-time ranging from about 0.20 to 0.33 second; and applying a voltage to the electrical circuit of such magnitude that the current, corrected for temperature variation and for residual current, is proportional to the dissolved oxygen in the liquid.

3. A process for the determination of dissolved oxygen in an electrolytic liquid using an instrument including a dropping mercury electrode and an anode comprising the steps of: filling the space between the dropping mercury electrode and the anode with the liquid so that the liquid forms part of an electrical circuit; causing discrete droplets of mercury to flow from the dropping mercury electrode with a drop-time ranging from 0.20 to 0.33 second; and applying a voltage to the electrical circuit of such magnitude that the current, corrected for temperature variation and for residual current, is proportional to the dissolved oxygen in the liquid.

References Cited in the file of this patent

UNITED STATES PATENTS 2,500,284     Heydrovsky _____ Mar. 14, 1950

OTHER REFERENCES

Kolthoff et al.: "Polarography," volume 2, 1952, pages 552–558, New York Interscience Publishers.